United States Patent [19]

Hayami

[11] Patent Number: 4,988,162
[45] Date of Patent: Jan. 29, 1991

[54] RADIATION RESISTANT MULTIPLE FIBER

[75] Inventor: Hiroyuki Hayami, Itami, Japan

[73] Assignee: Mitsubishi Cable Industries, Ltd., Amagasaki, Japan

[21] Appl. No.: 365,989

[22] Filed: Jun. 14, 1989

[30] Foreign Application Priority Data

Jun. 29, 1988 [JP] Japan .................. 63-162229

[51] Int. Cl.$^5$ .............................. G02B 6/06
[52] U.S. Cl. ...................... 350/96.25; 350/96.34
[58] Field of Search ............ 350/96.24, 96.25, 96.29, 350/96.30, 96.31, 96.33, 96.34

[56] References Cited

U.S. PATENT DOCUMENTS

| | | | |
|---|---|---|---|
| 3,933,454 | 1/1976 | DeLuca | 350/96.34 X |
| 4,680,045 | 7/1987 | Osafune et al. | 350/96.34 X |
| 4,690,500 | 9/1987 | Hayami et al. | 350/96.25 |
| 4,822,136 | 4/1989 | Hicks, Jr. | 350/96.34 |

FOREIGN PATENT DOCUMENTS 59-33405 2/1984 Japan.

OTHER PUBLICATIONS

*Journal of the Atomic Energy Society of Japan*, vol. 27, pp. 779–780, 1985.
National Conference Record, 1985, Semiconductor Devices and Materials, The Institute of Electronics and Communication Engineers of Japan, No. 399, Nov. 23–26, 1985.
Papers of Technical Meeting of Electrical Insulating Material, EIM-82-28, The Institute of Electrical Engineers of Japan, 1982.

*Primary Examiner*—John D. Lee
*Attorney, Agent, or Firm*—Armstrong, Nikaido, Marmelstein, Kubovcik & Murray

[57] ABSTRACT

It is disclosed a radiation resistant multiple fiber which is excellent in radiation resistance at the region of visible light, and therefore is suitable as an image transmitter of image scope, wherein a number of optical fiber elements each of which comprises a core composed of a pure silica glass and a cladding layer formed on the core and composed of a doped silica glass are mutually heat-fused, and said pure silica glass of the core having a chlorine content of lower than 1 ppm, and OH group content of lower than 1000 ppm, and also fluorine content of at least 100 ppm.

5 Claims, 1 Drawing Sheet

RADIATION RESISTANT MULTIPLE FIBER

BACKGROUND OF THE INVENTION

1. Field of the Invention

The present invention relates to a multiple fiber which is excellent in radiation resistance at the region of visible light, and therefore is suitable as an image transmitter of image scope.

2. Description of Prior Art

It has been used in much amount an image scope in the sites where it is possible to receive irradiation, such as an atomic pile, an atomic ship, an artificial satellite and the like.

It is well-known that as the image transmitter of image scope there are two kinds, that is, multiple fibers of silica glass type and multi-component glass type. Between them, the multiple fiber of silica glass type has in general excellent radiation resistance as compared with the multiple fiber of multi-component glass type, and therefore is selectively used for observation in the above mentioned irradiated sites.

According to the studies of the present inventor, however, the radiation resistance of the multiple fibers of silica glass type are various, and are varied by the material which composes of the core.

SUMMARY OF THE INVENTION

An object of the present invention is to provide a multiple fiber of silica glass type which is excellent in radiation resistance at the region of visible light.

Another object of the present invention is to provide a multiple fiber of silica glass type which is suitable as an image transmitter of image scope for industrial use at irradiated sites.

More specifically, the present invention provides a radiation resistant multiple fiber, wherein a number of optical fiber elements each of which comprises a core composed of a pure silica glass and a cladding layer formed on the core and composed of a doped silica glass are mutually heat-fused, and said pure silica glass of the core having a chlorine content of lower than 1 ppm, an OH group content of lower than 1000 ppm, and also fluorine content of at least 100 ppm.

DETAILED DESCRIPTION OF THE INVENTION

Figure 1:
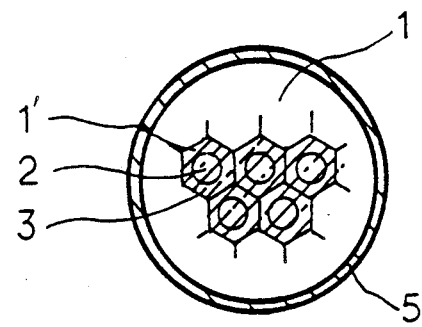
FIG. 1 is a cross-sectional view of an embodiment in accordance with the present invention.

Referring now to FIG. 1, a multiple fiber 1 is shown which consists of a number of elemental optical fibers 1' each of which consists of a core 2 made of a pure silica glass, and a cladding layer 3 made of a doped silica glass. These structures are integrated into a single fiber by mutual heat-fusions of neighboring cladding layers 3. The embodiment shown in FIG. 2 uses a number of elemental optical fibers 1' each of which further has a supporting layer 4 made of a pure silica glass on the cladding layer 3, and are integrated into a single fiber by mutual heat-fusions of neighboring supporting layers 4.

The difference in refractive index ($\Delta n$) between the core 2 and the cladding layer 3 is at least 0.008, preferably 0.01 to 0.020, more preferably 0.01 to 0.015.

The multiple fiber 1 shown in FIG. 1 may be produced, for example, in such a manner that a doped silica glass which becomes the cladding layer 3 is applied on a pure silica glass rod which becomes the core 2 to obtain a primary preform of a two-layer structure. Alternatively, the supporting layer 4 of a primary preform of a three-layer structure (FIG. 2) prepared by well known Rod-In-Tube method is removed by fire polishing to obtain a primary preform of a two-layer structure, then the primary preform of the two-layer structure is drawn to obtain a secondary preform of the elemental optical fiber 1', and further then a number, for example, of 100 to 100,000 of the secondary preforms is bundled and drawn at a temperature of 1,800° to 2,000° C. to obtain the multiple fiber 1 having a desired outer diameter, for example, of 0.1 to 5 mm, preferably 0.5 to 3 mm.

The multiple fiber 2 shown in FIG. 1 may be produced, for example, in a similar manner as of above, by using preforms of a three-layer structure prepared by Rod-In-Tube method.

As mentioned above, each core of the multiple fiber of the present invention should be made of a pure silica glass which is lower than 1 ppm in chlorine content, lower than 1000 ppm in OH group content, and higher than 100 ppm in fluorine content. Such a pure silica glass may be prepared, for example, by oxyhydrogen flame method, which is then dehydrated and sintered while applying $CF_4$.

In order to obtain a multiple fiber having more excellent radiation resistance, it is preferable to satisfy at least one of the following conditions:

(1) a pure silica glass whereof the core is composed of a chlorine content of lower than 0.5 ppm, preferably lower than 0.2 ppm, an OH group content of lower than 800 ppm, preferably lower than 500 ppm, and also fluorine content of 200 to 10,000 ppm, preferably 500 to 5,000 ppm, (2) the thickness of the cladding layer 3 being at least 1.0 $\mu$m, preferably at least 1.5 $\mu$m, (3) the ratio of the cross sectional area of the core in each elemental optical fiber to the total cross sectional area of the elemental optical fiber (hereinafter the value is refered to as the core area ratio) falls in the range of 20 to 60%, preferably 25 to 55%, (4) each elemental optical fiber further possesses a supporting layer on the cladding layer, and preferably the supporting layer is at least 0.01 $\mu$m in thickness, (5) elemental optical fibers residing in the region from the center of the cross section of the multiple fiber to at least 0.8 r (where r is the radius of the multiple fiber) being heat-fused in a regular or honeycomb-like configuration.

Explaining the condition (5), as mentioned above the multiple fiber of the present invention is prepared by drawing a bundle consisting of a number of elemental optical fiber preforms. When there exists marked scatterring in the outer diameter of the elemental optical fiber preforms to be used, or when there exists marked irregularities in temperature control and drawing speed in course of drawing, the following results due to random forces occur in the course of drawing:

(a) the arangement of the elemental optical fibers in the state of multiple fiber become irregular (b) the thickness of the cladding layers in part become thin, and thus two neighboring cores are much too close together, (c) furthermore a marked amount of voids between elemental optical fibers mutually are found.

Irregular arangement of elemental optical fibers, abnormal contiguity of cores, and void formation tend to lower the radiation resistance of multiple fibers, and therefore in the present invention it is preferable the elemental optical fibers positioning in the region from the center of the cross section of the multiple fiber to at least 0.8 r (where r being the radius of the multiple fiber) are regularly aranged by heat-fusion in, for example, a condition as of honeycomb-like configuration. However, in preferable embodiments the presence of defects, such as irregular arangement, abnormal contiguity of cores, void formation, etc. may exist in the above mentioned region if the defects are slight in extent and very small in amount. Furthermore in the present invention it is preferably that the elemental optical fibers positioning in the region of from the center of the cross section of the multiple fiber to at least 0.8 r are regularly arranged by heat-fusion in a honeycomb-like configuration with round or a round-like shape in the cross sectional form of the core and also with hexagonal or hexagon-like shape in the cross sectional form of the fiber. Such a multiple fiber having regular honeycomb-like configuration may be prepared, for example, by drawing according to the above mentioned manner a bundle of elemental optical fiber preforms each of which has a supporting layer 4 on a cladding layer 3, and the supporting layer 4 is composed of a silica glass having higher drawing temperature than that of the cladding layer.

The cladding layer 3 may be constructed, for example, with a silica glass containing B and/or F as a dopant. Such a doped silica glass may be prepared, for example, by the well known Chemical Vapor Deposition Method (C V D Mehtod) using a gas mixture as a raw material, such as a gas mixture composed of $BCl_3$, $BF_3$, $SiCl_4$, and oxygen, a gas mixture composed of $BCl_3$, $SiF_4$, and oxygen, a gas mixture composed of $BF_3$, $BCl_3$, and oxygen, and like. Among the above raw gas mixtures, the most preferable is the gas mixture composed of $BF_3$, $BCl_3$, and oxygen in view of obtaining a multiple fiber having more excellent radiation resistance.

Figure 2:
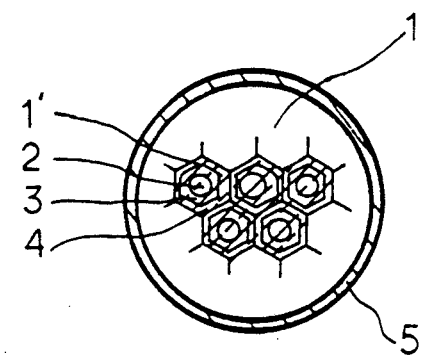
FIG. 2 is a cross-sectional view of another embodiment in accordance with the present invention.

The embodiment shown in FIG. 2 has the supporting layer 4 in each elemental optical fiber. When a material cotaining a remarkable amount of impurities is used as one constructing the supporting layer 4, it may give a bad effect to radiation resistance of a multiple fiber. Therefore as a material of the supporting layer 4, it is preferable to use a silica glass having a drawing temperature of at least 1,800° C., such as natural silica glasses, synthetic silica glasses, especially high purity synthetic silica glasses 99% by weight, further 99.9% by weight in purity.

In the course of preparing the multiple fibers of the present invention, it is preferable to use, for example, a silica glass pipe, to fill therein elemental optical fiber preforms, and then to draw the pipe together with fiber preforms, thus obtaining a multiple fiber having an outer skin layer made from the silica glass pipe fused on an assembly of elemental optical fibers fused mutually. These types of multiple fibers are excellent in flexibility and snapping resistance due to the existence of the outer skin layer.

Though the presence of chlorine in each silica glass of a cladding layer is tolerated in a supporting layer, or a skin layer in the present invention, the chlorine content in above each silica glass is preferably less than 500 ppm, more preferably less than 100 ppm in order to improve the radiation resistance of the multiple fiber.

EXAMPLES

The following examples illustrates in greater detail the multiple fiber of the present invention, but they are not to be construed as limiting the scope of the present invention.

EXAMPLE 1:

A silica glass is grown on a target of silica glass rod according to so-called Bernoulli's method by blowing the flame which is obtained by mixing $SiH_4$ and oxygen and burning the mixture. Then the silica glass thus grown is sinterd under the condition of applying $CF_4$ so as to obtain a silica glass rod 35 mm in outer diameter, and 200 mm in length. The silica glass rod is lower than 0.1 ppm in chlorine content, 1.5 ppm in OH group content, 3,900 ppm in fluorine content, and lower than 5 ppm in total impurity other than the above three, and also 1.4585 in refractive index.

The chlorine content and the fluorine content in the silica glass were measured in accordance with E S C A (Electron Spectroscopic Chemical Analysis), while the OH group content therein was measured in accordance with the following method:

Measurement of OH group content: the OH group content is obtained from the equation (1) when the value is 1 ppm or more, or the equation (2) when the value is lower than 1 ppm.

$$OH = 1.2 \times (L_1 - L_0) \quad (1)$$

$$OH = 1.85 \times (L_3 - L_2) \times 10^{-2} \quad (2),$$

wherein $L_1$ is the loss value (dB/km) of an optical conductor tested at a wave length of 0.94μm, $L_0$ is an assumed loss value (dB/km) of the optical conductor tested at the same wave length when OH group content thereof is zero, $L_3$ is the loss value (dB/km) of an optical conductor tested at a wave length of 1.38 μm, $L_2$ is an assumed loss value (dB/km) of the optical conductor tested at the same wave length when OH group content thereof is zero.

A core rod having an outer diameter of 11 mm made of the above pure silica glass was inserted into a synthetic silica glass tube (outer diameter: 26 mm, thickness: 1.5 mm, refractive index at 20° C.: 1.459) having on its inner surface a B-F-doped silica glass layer (refractive index at 20° C.: 1.4465) which is formed by M C V D Method (Modified Chemical Vapor Deposition Method) using $SiCl_4$, $BF_3$, and $O_2$, and collapsed by flame to obtain a preform having an outer diameter of 18.9 mm. The preform was drawn at a temperature of 2,100° C., and thus an elemental optical fiber preform 300 μm in outer diameter was prepared by Rod-in-Tube Method.

Six thousands of the elemental optical fiber preforms each of which is 20 cm in length were compactly filled in order in a silica glass tube. After the one end of the bundle of the elemental optical fiber preforms were partially heat-fused, the elemental optical fiber preforms were washed with an aqueous solution of fluoric acid (5% by volume), further washed with distilled water while applying ultrasonic wave, dried, and finally drawn together with the silica glass tube at a temperature of 2,000° C. to form a multiple fiber having an outer diameter of 1.0 mm composed of elemental optical fibers mutually heat-fused.

Each elemental optical fiber in the multiple fiber thus obtained is constructed with a core having a diameter of 7.3 μm, a cladding layer having a thickness of 2.1 μm, and the difference of refractive index (Δn) between these of the core and the cladding layer is 0.012, and also the core area ratio is 33%. The elemental optical fibers residing in the range from the center of the cross section of the multiple fiber to 0.95 r (where r being the radius of the multiple fiber) are heat-fused in a regular and honeycomb-like configuration.

EXAMPLES 2-5
COMPARATIVE EXAMPLES 1-3

Multiple fibers of Examples 2-5 and Comparative Examples 1-3 are prepared by the same manner using 6,000 of the elemental optical fiber preforms.

Details of structure and radiation resistance of these multiple fibers are shown in Table 1. The radiation resistance were evaluated by the following irradiation test.

Figure 3:
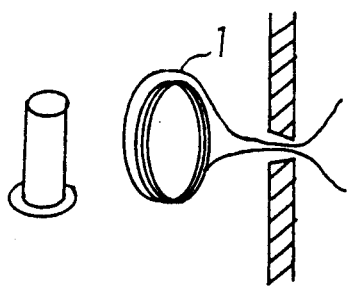
FIG. 3 is an explanatory figure for explaining a method of testing the radiation resistance of a multiple fiber in the atmosphere.

Irradiation test:

Ten meters portion of a multiple fiber test specimen of 30 meters was coiled and allowed to stand at a predetermined distance (dose rate: 2×10⁴ R/H) from a Co⁶⁰ γ ray source as shown in FIG. 3, and irradiated with a total γ ray dose of 3×10⁵ R. Both ends of the multiple fiber test specimen are taken out of a wall penetration, and the one end is connected to a 50 W incandesent light source and out put power from another end was measured by means of a monochrometer-photometer and recorded by means of a recorder. The test specimens were disconnected from the light source for interval where the measurment was not conducted in order to minimize light bleaching effect.

The values of loss increase in the multiple fiber test specimen are of at 480 nm with a total γ ray dose of $3 \times 10^5$ R. Image observation test was also conducted, wherein a standard test figure having 9 Kodak standard colors are observed through the multiple fiber test speciman just after the above irradiation test.

TABLE 1

|  | Example 1 | Example 2 | Example 3 | Example 4 | Example 5 | Co. Example 1 | Co. Example 2 | Com Example 3 |
|---|---|---|---|---|---|---|---|---|
| Chlorine content in core (ppm) | 0.02 | 0.04 | 0.60 | 0.20 | 0.41 | 20.0 | 0.50 | 0.05 |
| OH group content in core (ppm) | 1.5 | 4.2 | 80 | 30 | 150 | 5.4 | 1200 | 700 |
| Fluorine content in core (ppm) | 3900 | 2200 | 1700 | 900 | 320 | 300 | 120 | 10 |
| Core area ratio (%) | 33 | 50 | 41 | 34 | 31 | 35 | 31 | 32 |
| Thickness of cladding layer (μm) | 2.1 | 2.1 | 1.8 | 1.9 | 2.0 | 2.4 | 1.9 | 1.8 |
| Regurality of elemental optical fiber (%) | 90 | 93 | 85 | 88 | 90 | 90 | 88 | 86 |
| Loss increase at irrad. of 3 × 10⁵ R (dB/km, at 480 nm) | 48 | 60 | 85 | 125 | 170 | 650 | 1300 | 800 |
| Result for observing standard figure | observable 9 colors | " | " | " | " | observable only 2 colors | observable only 4 colors | observable only 4 colors |

What is claimed is:

1. A radiation resistant multiple fiber, wherein a number of optical fiber elements each of which comprises a core composed of a pure silica glass and a cladding layer formed on the core and composed of a doped silica glass are mutually heat-fused, and said pure silica glass of the core having a chlorine content of lower than 1 ppm, an OH group content of lower than 1000 ppm, and also fluorine content of at least 100 ppm.

2. A radiation resistant multiple fiber as set forth in claim 1, wherein a number of optical fiber elements each of which comprises a core composed of a pure silica glass, a cladding layer formed on the core and composed of a doped silica glass and a supporting layer formed on the cladding layer and composed of a silica glass having higher drawing temperature than that of the cladding layer are mutually heat-fused.

3. A radiation resistant multiple fiber as set forth in claim 1, wherein the elemental optical fibers positioning in the region from the center of the cross section of the multiple fiber to at least 0.8 r (where r being the radius of the multiple fiber) are regulerly aranged by heat-fusion in a condition as of a honeycomb-like configuration.

4. A radiation resistant multiple fiber as set forth in claim 1, wherein the thickness of the cladding layer is at least 1.0 μm.

5. A radiation resistant multiple fiber as set forth in claim 1, wherein the core area ratio of each elemental optical fiber falls in the range of 20 to 60%.

* * * * *